Dec. 9, 1952   F. D. BRADDON   2,620,669
COMPENSATED GYRO-VERTICAL
Filed Nov. 23, 1946   3 Sheets-Sheet 1
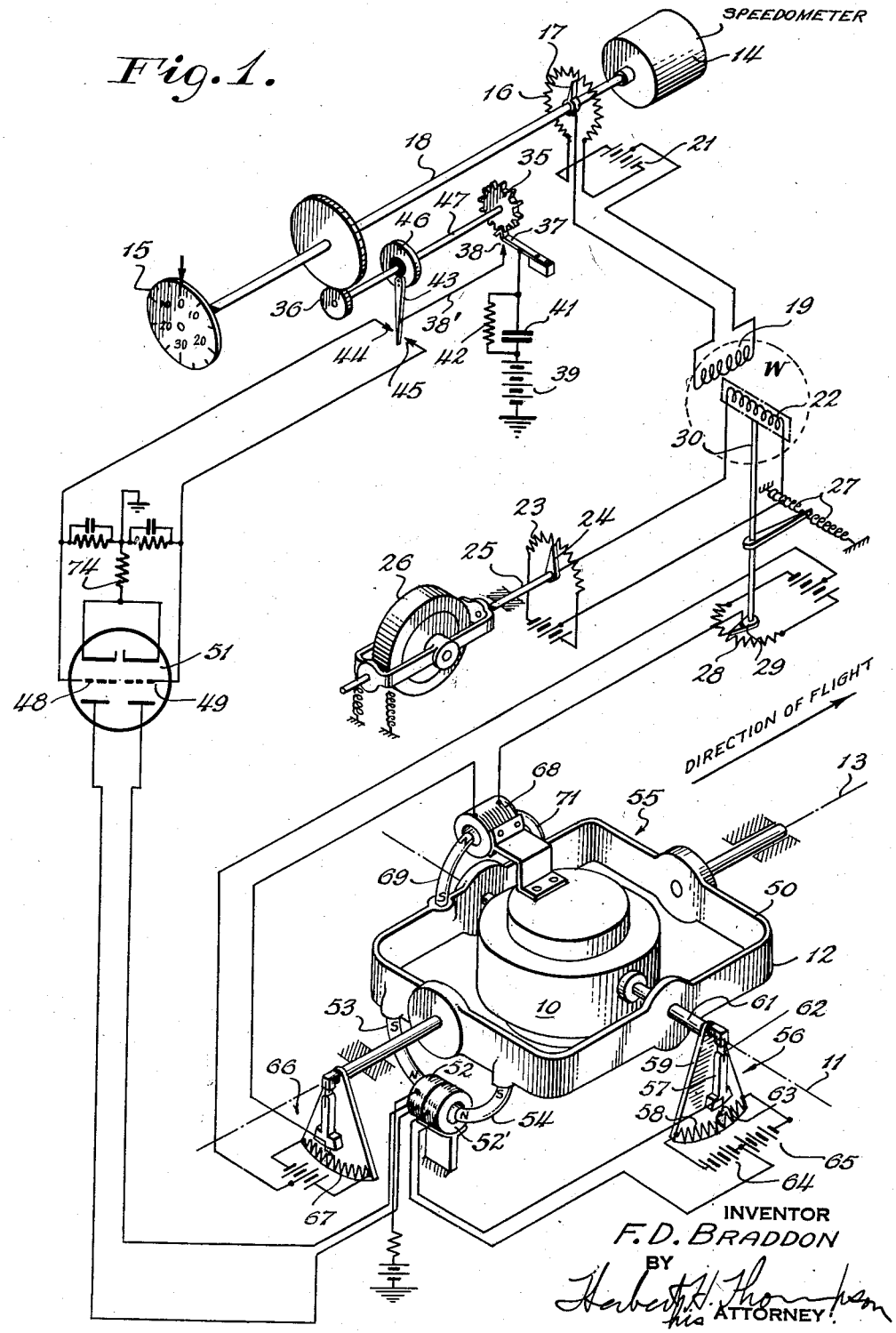
INVENTOR
F. D. BRADDON
BY
Herbert H. Thompson
his ATTORNEY Dec. 9, 1952   F. D. BRADDON   2,620,669
COMPENSATED GYRO-VERTICAL
Filed Nov. 23, 1946   3 Sheets-Sheet 2
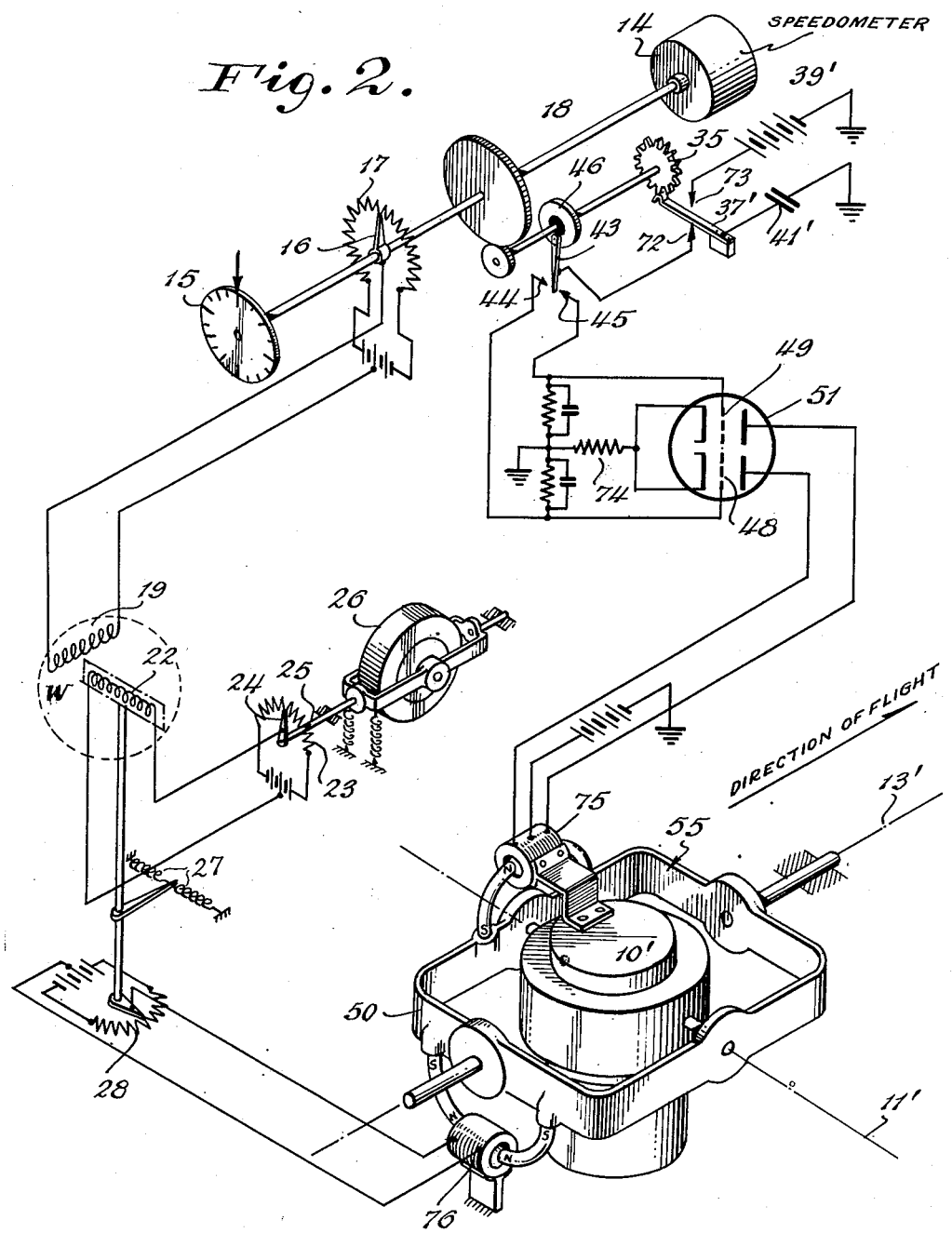
INVENTOR
F. D. BRADDON
BY
Herbert H. Thompson
his ATTORNEY.

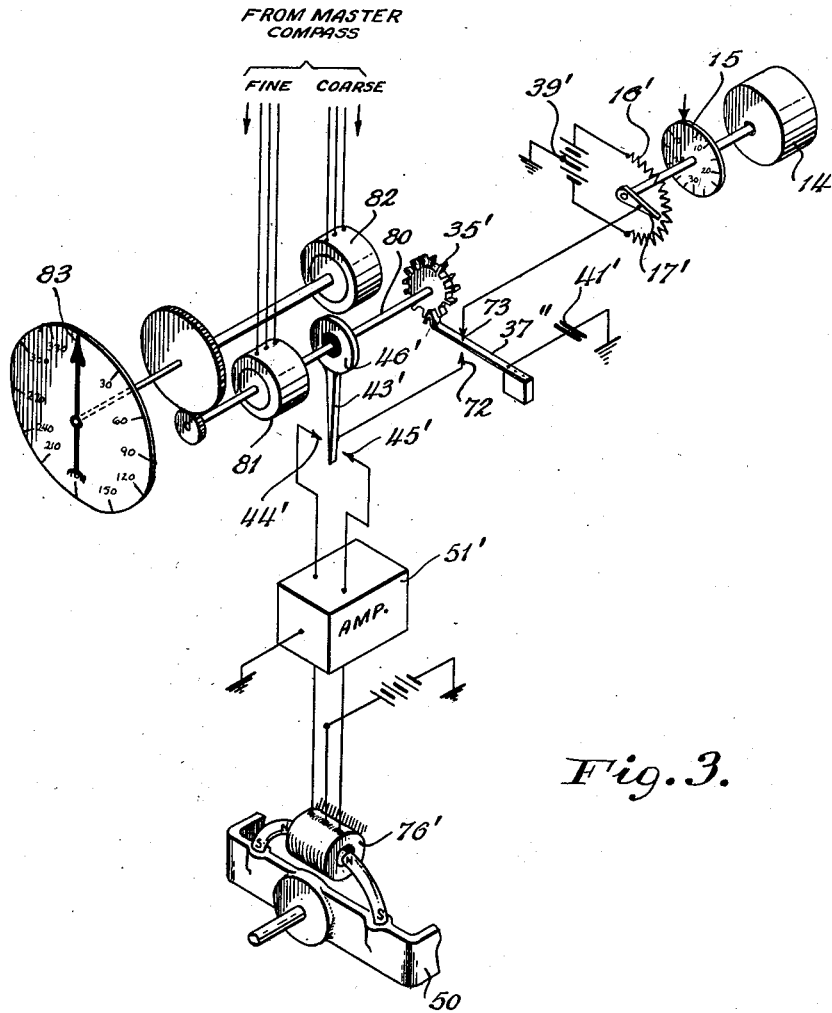

Patented Dec. 9, 1952

2,620,669

UNITED STATES PATENT OFFICE 2,620,669

COMPENSATED GYRO-VERTICAL

Frederick D. Braddon, Babylon, N. Y., assignor to The Sperry Corporation, a corporation of Delaware Application November 23, 1946, Serial No. 711,903

11 Claims. (Cl. 74—5.4)

This invention relates to gyroscopic instruments for indicating the horizontal and vertical on moving craft, which instruments are generally referred to in the art as gyro-verticals. Such instruments will maintain the true vertical with great accuracy when the craft is at rest or moving uniformly in a straight line, but are subject to temporary errors during and following changes of speed or course. Such errors arise from the fact that the ultimate control of a gyro-vertical is a gravitational controller, such as a pendulum which, of course, is subject not only to the acceleration of gravity but to any other acceleration force acting thereon, such as horizontal acceleration forces due to turns and change of speed. Various means have been proposed to overcome deviations due to such causes, one of which is a cut-out device for eliminating the gravitational control during turns and/or change of speed. Such devices, however, have the disadvantage that during such turns or change of speed, the gravitational control is severed so the gyro during that time may wander without being corrected to the vertical. Such devices, therefore, are not satisfactory for the types of ships and airplanes which are maneuvered a good part of the time. For instance, if the craft on which the gyro is mounted flew for some time on a circular or sinuous course the gravitational control of the gyro would be largely lost and the gyro may wander far from the true vertical with no means to correct the same.

According to my invention, I propose to apply a counteracting force to the gyro which is equal and opposite to the lateral acceleration force due to change of speed or turns, thereby preventing the aforesaid deviations and at the same time retaining the gravitational control, since the pendulum or other gravitational factor may remain in control of the gyro.

My invention is also applicable to gyros which are erected by being made pendulous instead of by a source of power operating at right angles to the tilt controlled by a gravitational factor.

My invention further provides a means for deriving both a countertorque for both types of acceleration, i. e., centrifugal or linear, from a simple speedometer or airspeed meter, combined in the case of turns with the output of a rate of turn responsive device.

My invention further contemplates securing of a signal proportional to the linear acceleration of the craft in a simple manner from an airspeed meter by an arrangement which derives therefrom a torque proportional to changes of velocity indicated by the meter, which, of course, is an acceleration term.

Referring to the drawings illustrating several forms of my invention,

Fig. 1 is a combined diagrammatic view and wiring diagram of my invention as applied to the control of a gyro-vertical which is erected by power controlled torque devices from gravitational factors or auxiliary pendulums, which exert a torque at right angles to the tilt proportional to the angle of tilt;

Fig. 2 shows another form of my invention applied to a pendulous type gyro; and

Fig. 3 shows a modified arrangement for securing a rate of turn signal.

The gyro-vertical may be of any suitable form, being represented as comprising a rotor casing 10 in which the rotor (not shown) is mounted for spinning about a normally vertical axis. It will be understood, however, that the invention is not limited to a gyro-vertical having but a single rotor as multiple gyro-verticals are well known in the art. The casing 10 is shown as mounted for oscillation about a transverse axis 11 in gimbal ring 12 which in turn is mounted for oscillation about a fore-and-aft axis 13 in a support (not shown) on the craft.

From the well-known equations connecting motion and acceleration forces, it is well known that the centrifugal acceleration force during turns is proportional to the product of the rate of turn $\omega$ and linear speed S. In other words, $$F = \omega S$$

It is well known that the acceleration force on a mass due to changes of speed is directly proportional to the rate of change of speed or acceleration and changes sign with the direction of acceleration (i. e., whether acceleration or deceleration). In other words, $$F = a$$

I propose to derive these terms in a simple manner from any suitable form of speedometer, such as an airspeed meter in the case of airplanes or ship's log-speedometer in the case of ships, which is represented diagrammatically at 14, and which is shown as having a speed indicating dial 15 which indicates miles per hour or knots, as the case may be. From the shaft of such meter, I operate two devices, one for obtaining a term representing speed S and the other obtaining a term representing acceleration $a$. The speed term I may conveniently obtain from a potentiometer 16 having a wiper 17 connected to the shaft 18 of the potentiometer and the output of which is proportional to the indicated speed and the sign of the output being also preferably reversible in accordance with the direction of motion. Speed indicator 15 therefore reads both forward and backward speed. The output may be combined with a rate of turn factor by applying it across the stationary coil 19 of a moving coil instrument W of the D. C. wattmeter type. A convenient arrangement for this purpose is to connect the two ends of the circular winding 16 to the opposite terminals of a source of direct current such as battery 21 and to connect the wiper 17 and a center tap on the battery to the opposite ends of coil 19. The voltage across the moving coil 22 of said wattmeter is controlled from a potentiometer 23, the wiper 24 of which is mounted on the shaft or trunnion 25 of a rate of turn gyro 26, the precession of which from norm is proportional to the rate and reversible with the direction of turn. Coil 22 is normally centralized in a position substantially at right angles to coil 19 by centralizing springs 27, its deflection from this central position, in one way or the other, is controlled by the product and relative sign or direction of the current flowing through coils 19 and 22. Therefore, the angle of displacement of the coil 22 represents the product of rate of turn and velocity and a signal may be derived therefrom by means such as the potentiometer 28 having a wiper 29 secured to the shaft 30 of coil 22. It may be noted that the sign of the signal from potentiometer 28 does not reverse if the ship reverses its direction, but still continues a circular course about the same center. This is correct since the centrifugal force of pendulum 66 remains in the same direction (radial) under such conditions.

For obtaining the acceleration term from the speedometer, I have shown a means for obtaining an impulse for each unit change of speed indicated by the speedometer coupled with means for integrating such impulses so that the summation of the same represents the total acceleration $a$. A simple method of accomplishing this is shown by having a toothed wheel or a gear 35 turned from the shaft 18 of the speedometer 14 preferably through step-up gearing 36. On the periphery of said wheel 35 rests the end of a light leaf spring 37 which alternately closes and opens the contact 38 as the teeth or spokes of the wheel pass over the end of the spring arm. Contact 38 is placed in series with a source of direct current represented by battery 39 and a condenser 41 around which is placed a high resistance 42. From contact 38 the circuit leads through a reversing switch 43 operating between opposite contacts 44 and 45 to obtain direction sense in the output. The arm 43 is shown as secured to a reversible disc 46 having a slip friction connection with the shaft 47 of toothed wheel 35. Therefore, arm 43 will be held against contact 44 upon clockwise rotation of the wheel 35, but against contact 45 upon counterclockwise rotation. Contacts 44 and 45 are respectively in circuit with the grids 48, 49 of a double triode 51, which tube acts to amplify the charge supplied to the grids and to supply the amplified output to center tapped winding 52 of a double wound solenoid operating about one of the horizontal axes of the gyroscope in connection with a pair of permanent magnets 53, 54 secured to the gimbal ring 12 of the gyro-vertical 55. In case the gyroscope is of the power erected type rather than of the pendulous type, the coil operates about the fore-and-aft axis 13 of the gyro to oppose the torque which would otherwise be exerted on the gyro from the pendulous controller 56 which is effected by change of speed. Such torque is shown as obtained from a pendulum 57 by potentiometer 58 mounted on an arm 59 secured to a minor trunnion 61 of the gyro, the wiper 63 for the potentiometer being mounted on the pendulum 57. The pendulum is preferably pivoted on the support by means of a leaf spring 62, so that the angle through which it tilts may be kept small but proportional to the lateral acceleration force as more fully explained in the copending application of John M. Slater, Serial No. 680,499, filed June 29, 1946, for Acceleration Correction for Gyro-Verticals. The wiper 63 is normally positioned at the center of the potentiometer. The ends of the potentiometer are electrically connected to opposite poles of one or more batteries 64 and 65. The center terminal of the batteries 64 and 65 is shown as connected by a suitable lead to one end of the second solenoid winding 52′, the other end of said winding being connected to the wiper 63.

The output of the potentiometer 58 during acceleration is, therefore, opposed by the output of the triode 51, so that the torquing means about axis 13 is effective to compensate the gravitationally erected gyro-vertical instrument for the effect thereon of acceleration along the fore and aft axis of the craft. Similarly, the output of potentiometer 28 is opposed by the output of a potentiometer arrangement controlled by a pendulum 66 to operate the torquing means about axis 11 defined by a solenoid 68 and a polarized magnetic double core 69, 71. The torquing means about axis 11 is effective to compensate the gravitationally erected gyro-vertical for the effect thereon of acceleration due to centrifugal force during turns of the craft about its vertical axis.

The method by which I secure an acceleration term from the toothed wheel 35 and the circuit connection thereof is as follows: When contact 37 is closed, battery 39 starts to charge condenser 41 during which time current passes through wire 38′ to one of contacts 44 or 45 and puts an increasing charge on one of grids 48 or 49. This will continue, assuming the contacts remain closed momentarily, until the condenser is charged, at which time the current flow will stop. If now the tooth passes from under the spring arm 37, contact 38 will be broken and the condenser will slowly discharge through resistor 42, so that by the time the next contact is made the cycle will be repeated. The result is that a given quantum of current tends to flow through the coil 52 for each tooth passed over. Since the gyro is very slowly affected by such impulses, the gyro will integrate these impulses and the effect on the gyro will be the summation of the impulses which represents acceleration.

In the arrangement in Fig. 2, a somewhat different method of obtaining the impulses or quantum of current is shown for opposing longitudinal acceleration forces. In this case, the spring arm 37′ is provided with upper and lower contacts 72 and 73. When the upper contact is closed, the battery 39′ is in circuit with the condenser 41′ to charge the same. When, however, the spring arm passes over the top of a tooth, contact 73 is broken and 72 made, thus permitting the condenser to discharge through one or the other of contacts 44 or 45 as aforesaid to place a charge on one or the other of the grids 48, 49 which will, of course, leak off even if switch 37′ remains closed for some time through the usual grid leak resistor 74. Obviously this method of securing impulses may be used in connection with the type of gyro shown in Fig. 1 as well as with the type of gyro shown in Fig. 2.

The gyro shown in Fig. 2 is an ordinary pendulous gyro or gyro pendulum 10', which is maintained erect by being pendulously mounted about both horizontal axes, namely, primary axis 13' and secondary axis 11'. During acceleration, a direct torque on the gyro in the opposite direction to the acceleration is exerted on the gyro so that in this form of my invention the counterbalancing torque is applied in opposition to the torque directly exerted by the acceleration force. Therefore, a counterforce proportional to longitudinal acceleration is applied through solenoid 75 directly about the transverse axis 11' of the gyroscope, while the force to counter-balance centrifugal force is applied through the solenoid 76 acting about the fore-and-aft axis 13' of the gyro. In this case also, it might be noted that only one source of current is applied to each of the solenoids, as in this case, the torque to be balanced acts directly on the gyroscope and not through a source of power acting normal to the acceleration force as in the case of Fig. 1.

No damping means is shown for the gyro-vertical in Fig. 2, although in practice some damping means will be necessary. Damping may readily be secured by an arrangement similar to that used for applying the erection torques in Fig. 1, except in this case the damping torques will be made relatively smaller than the direct force of gravity. If such a damper is employed, however, it will be understood that it would be desirable to employ some means for preventing the damper from causing deviation during turns, such as a damping eliminator or the acceleration force cancelling means of Fig. 1.

The pulse integrating method of obtaining a correction factor or torque may also be employed if desired for opposing centrifugal force during turns. Such a modification is illustrated in Fig. 3, it being understood that this system may be employed in either Fig. 1 or 2 in place of the rate of turn gyroscope. A signal proportional to velocity is shown as obtained by a potentiometer 16', 17' actuated from any form of speedometer or airspeed meter 14. The voltage passed by the potentiometer is intermittently supplied to condenser 41', which is charged from battery 39' through the potentiometer when switch 73 is closed, in a manner similar to the circuit of Fig. 2 except that the supply voltage in this instance is varied with speed. As in Fig. 2, the condenser is alternately charged and discharged as switch arm 37" moves from one contact 73 to the other 72. For actuating said arm a means responsive to turn of the craft is employed. This may be readily accomplished by mounting the toothed wheel 35', against which the spring arm 37" rests, on the shaft 80 of a repeater motor 81, which is turned whenever the craft turns, as by means of a transmitter actuated from some form of master compass (not shown). A fine and coarse system of transmission is shown, repeater motor 81 being the fine repeater actuated from a fine transmitter on the compass and 82 being the coarse receiver actuated from a coarse transmitter on the compass. The repeater compass pointer or card 83 is shown on the shaft of the coarse repeater motor 82.

As before, I also mount on the shaft 80, a slip-friction disc 46' carrying a contact arm 43' which is held against one of contacts 44', 45' depending on the direction of turn of the ship. The contacts lead to amplifier 50' as before, the output of which excites in one direction or the other the solenoid 76' which applies a torque about the proper axis of the gyroscope only the gimbal 50 being shown. In case the gyro is of the pendulous type as shown in Fig. 2, this solenoid would act about the fore-and-aft axis to directly oppose the centrifugal force on the pendulous factor of the gyroscope. In case, however, the gyroscope is of the power-erected type, as shown in Fig. 1, the solenoid would act about the transverse axis of the gyroscope as does solenoid 68 in Fig. 1.

As before, a series of current impulses would reach the solenoid, the number of impulses being proportional to the amount of turn, and the rapidity of the impulses to the rate of turn, the resulting precession of the gyroscope being an integration of the pulses so that resulting precession will be proportional to the rate of turn. Since, however, the average amount of each impulse is varied with the speed of the ship through varying the charge on the condenser 41' by means of the potentiometer 16', the gyroscope will have a torque applied thereto during turns which is proportional to the product of the rate of turn and airspeed and reversible with the direction of the centrifugal force.

It will, of course, be obvious that each of the circuits described above could be simplified by designing it for forward speeds only, that is neglecting reverse operation, which seldom occurs and in fact in airplanes never occurs.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gravitationally erected gyro-vertical instrument for dirigible craft, means for applying a torque thereto about one axis to compensate for the effect of acceleration upon the instrument due to centrifugal force, means for applying a torque thereto about the other axis to compensate the instrument for the effect thereon of linear acceleration, means for producing a signal proportional to a product of the rate of turn and speed of the craft operatively connected to the first of said torque means and means for producing a signal proportional to the linear acceleration of the craft operatively connected to the other of said torque means.

2. A gyro-vertical instrument as claimed in claim 1, wherein said means for producing a signal proportional to linear acceleration includes a speedometer, and means operated by said speedometer for producing an impulse signal for each unit change of speed of the craft.

3. A gyro-vertical instrument as claimed in claim 1, wherein the means for producing the signal proportional to the rate of turn and speed of the craft includes a speedometer, a rate of turn measuring device, and combining means responsive to said speedometer and rate of turn measuring device.

4. In a gyro pendulum subject to disturbances during acceleration of the vehicle on which it is mounted, a pendulous rotor frame universally supported about mutually perpendicular, normally horizontal axes, one of which is fore and aft of the vehicle and the other of which is athwartship of the vehicle, means for applying a variable torque about the fore-and-aft axis of said pendulous rotor frame, means for applying a variable torque about the transverse axis of said pedulous rotor frame, means for activating said first-named torque means in accordance with centrifugal acceleration of the vehicle, and means for activating the second-named torque device in accordance with linear acceleration of the vehicle.

5. A gyro pendulum as claimed in claim 4, wherein both of said last two means are controlled from a speedometer.

6. In a gyro-vertical subject to disturbances due to acceleration forces during turns, a mechanism for counteracting such forces including a compass actuated shaft rotated by the turning of the craft, make and break contact means operated thereby adapted to pass an electrical impulse for each unit change of heading, said impulses affecting the gyroscope through said first means in a cumulative manner, and means for varying the strength of each impulse with the speed of the craft.

7. In a gyro-vertical for craft subject to a disturbing torque during turns of the craft, a torque device for applying a counter-torque thereto, means of energizing said device including means for producing a pulse signal for each unit angle turned through, said pulses intermittently energizing said device and affecting the gyroscope in a cumulative manner, a speedometer, and means governed thereby for varying the strength of each pulse.

8. In a gyro vertical instrument for dirigible craft subject to a disturbing torque due to acceleration of the craft, means for applying a counteracting torque on said instrument, means for measuring the speed of the craft, and means responsive to said speed measuring means for producing intermittent signals for pulsing said countertorque applying means with each unit change in the speed of the craft, whereby the number of pulses is varied with the amount of speed change of the craft to thereby vary the strength of the integrated torque proportionally to acceleration.

9. A gyro vertical instrument for dirigible craft having a rotor frame supported with freedom about two normally horizontal axes, one of which is positioned fore and aft of the craft and the other of which is positioned athwartship of the craft, gravity responsive erecting means for said frame, means for applying a torque about the fore and aft axis of the frame to compensate the instrument for the effect thereon of linear acceleration, means for applying a torque about the athwartship axis of the frame to compensate the instrument for the effect thereon of centrifugal acceleration, means for producing a signal proportional to the linear acceleration of the craft operatively connected to said fore and aft axis torque applying means, and means for producing a signal proportional to a product of the rate of turn and speed of the craft operatively connected to said athwartship axis torque applying means.

10. A gyro vertical instrument for dirigible craft having a pendulous rotor frame supported with freedom about two normally horizontal axes, one of which is positioned fore and aft of the craft and the other of which is positioned athwartship of the craft, means for applying a torque about the fore and aft axis of the frame to compensate the instrument for the effect thereon of the centrifugal acceleration, means for applying a torque about the athwartship axis of the frame to compensate the instrument for the effect thereon of linear acceleration, means for producing a signal proportional to the linear acceleration of the craft operatively connected to said athwartship axis torque applying means, and means for producing a signal proportional to a product of the rate of turn and speed of the craft operatively connected to said fore and aft axis torque applying means.

11. In a gyro vertical for craft subject to a disturbing torque during turns of the craft, a torque device for applying a counter-torque thereto, pulse producing means operatively connected to said torque device to intermittently excite the same, a compass actuated shaft rotated by turning of the craft governing said pulse means so that the number of pulses is proportional to the magnitude of the turn, and a speedometer governing the magnitude of said pulse means so that the amplitude of each pulse is proportional to the speed of the craft.

FREDERICK D. BRADDON.

REFERENCES CITED

The following references are of record in the file of this patent:

UNITED STATES PATENTS

| Number | Name | Date |
|---|---|---|
| 2,137,974 | Fischel | Nov. 22, 1938 |
| 2,188,606 | Koster | Jan. 30, 1940 |
| 2,380,941 | Carter | Aug. 7, 1945 |
| 2,419,063 | Fischer | Apr. 15, 1947 |
| 2,427,153 | Poitras et al. | Sept. 9, 1947 |
| 2,501,885 | Barnes et al. | Mar. 28, 1950 |
| 2,504,604 | Tear | Apr. 18, 1950 |
| 2,530,154 | Davis | Nov. 14, 1950 |